Aug. 6, 1935.    G. Q. LEWIS    2,010,095
FRICTION SHOCK ABSORBING MECHANISM
Filed Sept. 3, 1931
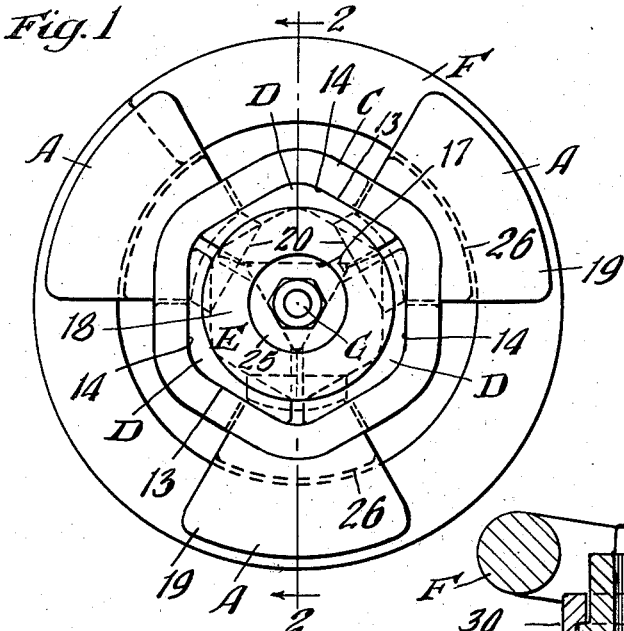
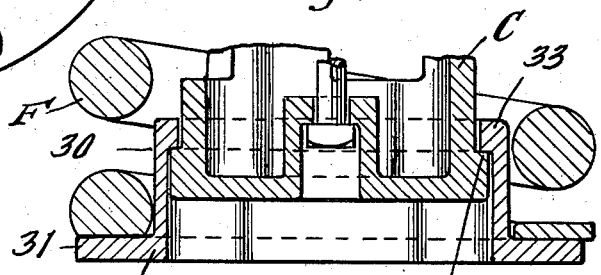
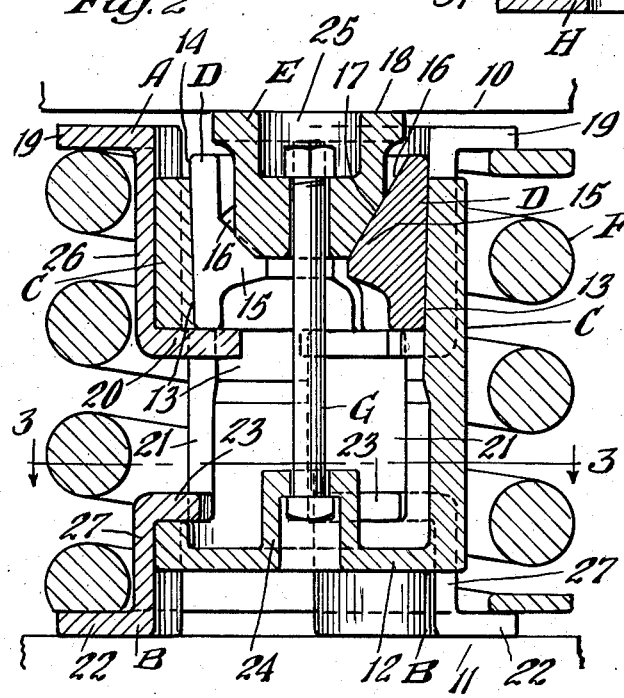
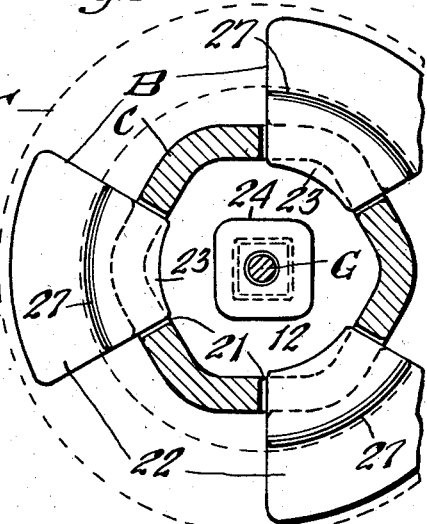
Inventor
Goodrich Q. Lewis
By Henry Fuchs Atty.
Witness
Wm. Geiger Patented Aug. 6, 1935

2,010,095

UNITED STATES PATENT OFFICE 2,010,095

FRICTION SHOCK ABSORBING MECHANISM

Goodrich Q. Lewis, Wheaton, Ill., assignor to W. H. Miner, Inc., Chicago, Ill., a corporation of Delaware Application September 3, 1931, Serial No. 560,977

6 Claims. (Cl. 213—24)

This invention relates to improvements in friction shock absorbing mechanisms.

One object of the invention is to provide a friction shock absorbing mechanism in the form of a highly efficient unit of simple design, which is employed in connection with car trucks and railway draft riggings, replacing the usual truck spring members and cushioning springs of tandem spring gears or other shock absorbing gears of railway draft riggings.

Another object of the invention is to provide a high capacity shock absorbing mechanism of the character specified in the preceding paragraph, affording preliminary spring action followed by progressively increasing frictional resistance during compression, thereby most effectively cushioning shocks, the frictional resistance being provided by a friction shell and cooperating friction shoes, wherein the shell is movable with respect to the cooperating follower means to obtain the preliminary spring action, and a single spring means provides the preliminary spring action and also resists relative movement of the friction shoes and shell.

Other objects of the invention will more clearly appear from the description and claims hereinafter following.

In the drawing, forming a part of this specification, Figure 1 is a top plan view of my improved friction shock absorbing unit. Figure 2 is a transverse, vertical sectional view, corresponding substantially to the line 2—2 of Figure 1, this view also showing end follower means cooperating with the unit. Figure 3 is a transverse, horizontal sectional view, corresponding substantially to the line 3—3 of Figure 2. And Figure 4 is a view similar to Figure 2, showing the lower part only of the unit and illustrating a different embodiment of the invention.

In carrying out my invention, I provide a friction shock absorbing mechanism in the form of a unit, which is employed between the follower-acting abutment members 10 and 11. These abutment members 10 and 11 may be either the usual end followers employed in connection with a railway draft rigging or abutment members of car trucks, which ordinarily cooperate with the truck springs.

Referring first to the embodiment of the invention illustrated in Figures 1, 2, and 3, my improved friction shock absorbing unit comprises broadly a pair of sectional spring followers A and B; a friction shell C; a set of three friction shoes D—D—D; a wedge block E; a spring resistance F; and a retainer bolt G.

The friction shell C of my improved friction unit is preferably of hexagonal transverse cross-section, as clearly shown in Figures 1 and 3. The shell is closed at one end by a transverse wall 12 and is provided with interior friction surfaces 13—13 at the opposite end. The friction surfaces 13—13 are preferably slightly converged inwardly of the shell.

The three friction shoes D—D—D are of similar design, except as hereinafter pointed out. Each shoe is provided with a V-shaped outer friction surface 14, which cooperates with two adjacent friction surfaces 13—13 of the friction shell C. On the inner side, each shoe has a lateral enlargement 15 provided with a wedge face 16. The wedge faces 16 of two of the shoes are preferably disposed at a blunter angle with respect to the longitudinal axis of the mechanism than the third shoe.

The wedge block E, which cooperates with the friction shoes, is provided with three wedge faces 17—17—17 at the inner end thereof, which cooperate with the friction shoes D—D—D. Two of the faces 17—17 of the wedge are inclined at a blunter angle with respect to the longitudinal axis of the mechanism than is the third face, so as to properly cooperate with the corresponding friction shoes. The wedge block E presents a flat outer end face 18, which bears directly on the follower-acting member 10.

The spring followers A and B are of sectional form, each follower preferably comprising three spaced sections. The spring follower A is disposed at that end of the shell which is provided with the interior friction surfaces and has each section thereof provided with a laterally outwardly projecting abutment flange 19. The three flanges 19—19—19 of the spring follower A provide abutment means for the corresponding end of the spring resistance F. At the inner end, each section of the spring follower A is provided with a laterally inwardly extending arm or lug 20, which engages within a longitudinally disposed opening or slot 21 provided in the corresponding side wall section of the friction shell C. The flange 19 and the arm 20 of each section of the spring follower A is connected by a web 26 disposed exteriorly of the friction shell. As most clearly shown in Figure 2, each arm 20 projects entirely through the corresponding wall section of the shell C and extends inwardly beyond the same. The extended portion of each arm 20 forms abutment means on which the inner end of the corresponding friction shoe D bears. As will be evident, the arms 20—20 of the sections of the spring follower A have shouldered engagement with the end walls of the slots 21—21 of the shell to limit outward movement of the spring follower. The parts are so proportioned that in the normal position thereof the outer end flanges 19—19 of the sections of the spring follower A are slightly spaced from the main follower-acting member 10.

The spring follower B, which is disposed at the closed end of the friction shell C, is also composed of three sections. Each section of the spring follower B has a laterally outwardly extending flange 22 bearing on the corresponding main follower-acting member 11 and forming an abutment member for the corresponding end of the spring resistance F. At the inner end, each section of the spring follower B is provided with a laterally inwardly projecting arm or lug 23, which engages through the corresponding slot 21 of the friction shell and has shouldered engagement with the outer end wall of said slot to limit outward movement of the sectional follower B with respect to the shell C. The flange 22 and arm 23 of each section of the spring follower B are connected by a web 27, which is disposed outwardly of the friction shell C. The parts are so proportioned that the spring follower B in its normal position has the outer end thereof projecting outwardly beyond the corresponding end of the friction shell C.

The main spring resistance F is in the form of a relatively heavy coil surrounding the friction shell and having its opposite ends bearing on the flanges 19—19 and 22—22 respectively of the spring followers A and B, thereby opposing relative approach of these spring followers.

The unit is held assembled by the retainer bolt G, which has its opposite ends anchored to the friction shell C and wedge block E respectively, the head of the bolt being seated in an inwardly projecting boss 24 on the end wall 12 of the shell C, and the nut of the bolt being seated in a pocket 25 provided in the outer end of the wedge block E. In addition to holding the mechanism assembled, the bolt G also serves to maintain the main spring resistance F under a predetermined initial compression.

In the operation of my improved friction shock absorbing unit as shown in Figures 1, 2, and 3, upon relative movement of the follower-acting members 10 and 11 toward each other, the wedge block E will be moved inwardly of the friction shell C and toward the spring follower B. Inasmuch as the three friction shoes D—D—D bear directly on the inwardly projecting arms 20—20 of the sections of the spring follower A, the spring F will be compressed against the spring follower B. As the friction shell C is free to move a limited distance with respect to the spring follower B, the friction created between the friction shoes and the surfaces of the shell will cause the shell to move toward the main follower-acting member 11 during the first part of the compression stroke of the mechanism. This action will continue until the rear end of the shell C engages the follower-acting member 11, whereupon the friction shoes will be compelled to move with respect to the shell C during the remainder of the compression of the mechanism. The compression of the mechanism is limited by engagement of the follower-acting member 10 with the corresponding end of the friction shell C.

When the actuating force is reduced in release of the mechanism, the expansive action of the spring resistance F will return the spring followers A and B to the position shown in Figure 2, thereby also restoring the friction shell C, the friction shoes D—D—D, and the wedge block E to the full release position. As will be understood, outward movement of the wedge block is limited by the retainer bolt G, thereby also limiting the movement of the other parts of the shock absorbing unit.

Referring next to the embodiment of the invention illustrated in Figure 4, the construction is identical with that illustrated in Figure 2, with the exception that the spring follower at the bottom end of the unit is of one piece construction and the bottom end of the friction shell is slightly modified so as to properly cooperate with this spring follower. The bottom spring follower, which is indicated by H in Figure 4, comprises a cylindrical sleevelike portion 30 within which the bottom end of the friction shell C is telescoped. At the outer end, the sleeve section 30 is provided with a laterally projecting annular flange 31, which cooperates with the main follower-acting member 11 in the same manner as the spring follower B referred to in connection with Figures 1, 2, and 3. The annular flange 31 forms the spring abutment means for the corresponding end of the main spring resistance F. The friction shell C has an annular shoulder 32 at the closed end thereof, which engages with an inwardly projecting annular flange 33 at the inner end of the sleeve portion 30 of the spring follower H. As will be clear, the shouldered engagement between the spring follower H and the friction shell C determines the outward movement of the spring follower with respect to the shell in the same manner as the arms 23—23 of the sections of the spring follower B hereinbefore described.

The operation of the friction shock absorbing unit illustrated in Figure 4 is the same as that hereinbefore described in connection with Figures 1, 2 and 3.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior friction surfaces at one end thereof; of spring followers at opposite ends of the shell, each of said spring followers having laterally inwardly projecting arms extending through the side wall of the shell and having shouldered engagement with the shell to limit outward movement of the spring follower with respect to said shell; a spring resistance surrounding the shell and interposed between said spring followers; friction shoes within the shell having frictional engagement with the interior surfaces thereof and bearing at their inner ends on the inwardly projecting arms of the spring follower at the corresponding end of the shell; and a block having wedging engagement with the shoes, said block projecting outwardly beyond the last named spring follower to directly receive the actuating force.

2. In a friction shock absorbing mechanism, the combination with a friction shell having interior friction surfaces at one end thereof, said shell having longitudinal guide openings in the side walls thereof; of a spring follower at each end of the shell, each spring follower having laterally inwardly projecting arms at the inner end thereof projecting through the guide openings of the side walls of the shell and having shouldered engagement with the outer end walls of said openings to limit outward movement of the follower with respect to the shell; a spring resistance surrounding the shell and opposing relative movement of the spring followers toward each other; a plurality of friction shoes within the shell cooperating with the friction surfaces thereof and bearing at their inner ends on the arms of the corresponding spring follower; and a wedge block having wedging engagement with said shoes, said block projecting outwardly of the last named spring follower to directly receive the actuating force.

3. In a friction shock absorbing mechanism, the combination with a friction shell having interior friction surfaces at one end thereof, said shell having longitudinal guide openings in the side walls thereof; of a spring follower at each end of the shell, each spring follower having laterally inwardly projecting arms at the inner end thereof projecting through the guide openings of the side walls of the shell and having shouldered engagement with the outer end walls of said openings to limit outward movement of the follower with respect to the shell; a spring resistance surrounding the shell and opposing relative movement of the spring followers toward each other; a plurality of friction shoes within the shell cooperating with the friction surfaces thereof and bearing at their inner ends on the arms of the corresponding spring follower; and a wedge block having wedging engagement with said shoes, said block projecting outwardly of the last named spring follower to directly receive the actuating force, and the spring follower at the other end of the shell projecting outwardly beyond said end of the shell to provide for relative movement of the shell and said spring follower during part of the compression stroke of the mechanism.

4. In a friction shock absorbing mechanism, the combination with a friction shell having interior friction surfaces at one end thereof; of sectional spring followers at opposite ends of the shell, each section of each spring follower having a laterally inwardly projecting arm extending through the side wall of the shell and having shouldered engagement with the shell to limit outward movement of the spring follower with respect to said shell; a spring resistance surrounding the shell and interposed between the sectional spring followers; friction shoes within the shell having engagement with the friction surfaces thereof and bearing at their inner ends on the inwardly projecting arms of the corresponding sectional spring follower; and a block having wedging engagement with the shoes, said block projecting outwardly beyond the last named spring follower to directly receive the actuating force.

5. In a friction shock absorbing mechanism, the combination with a friction shell having interior friction surfaces at one end thereof, said shell having longitudinally disposed guide openings in the side walls; of a three-part sectional spring follower at each end of the shell, each part of each spring follower having a laterally inwardly projecting arm at the inner end thereof extending through the guide openings of the side walls of the shell and having shouldered engagement with the outer end walls of said openings to limit outward movement of the same with respect to the shell; a spring resistance surrounding the shell and opposing relative movement of said spring followers toward each other; a plurality of friction shoes within the shell cooperating with the friction surfaces thereof and bearing at their inner ends on the arms of the sections of the corresponding spring follower; and a wedge block having wedging engagement with said shoes, said block projecting outwardly of the last named spring follower to directly receive the actuating force.

6. In the friction shock absorbing mechanism, the combination with a friction casing having interior friction surfaces at one end thereof, said casing having recesses in the side walls between the ends thereof, the opposite end walls of said recesses presenting stop shoulders; of a spring follower means at each end of the casing, exterior to the casing, each of said spring follower means having inwardly projecting arms engaging in said recesses and being in shouldered engagement with the stop shoulders of the casing to limit outward movement of said follower with respect to the casing, said shoulders of the shell and spring follower means being relatively displaceable radially of the casing to bring them out of alignment and permit application or removal of the spring follower means, the spring follower at the end of the shell remote from the friction surfaces projecting outwardly beyond said end of the casing; spring resistance means surrounding the casing and interposed between said spring followers and bearing on both of said spring followers; friction shoes within the casing having frictional engagement with the friction surfaces thereof, said shoes having shouldered engagement with the spring follower at the corresponding end of the casing; and a wedge block having wedging engagement with the shoes, said wedge block projecting outwardly beyond the corresponding spring follower to receive the actuating force.

GOODRICH Q. LEWIS.